(12) United States Patent  
Park et al.

(10) Patent No.: US 8,582,044 B2
(45) Date of Patent: Nov. 12, 2013

(54) LIQUID CRYSTAL DISPLAY AND REPAIRING METHOD THEREOF

(71) Applicant: Samsung Display Co., Ltd., Yongin (KR)

(72) Inventors: Kyung-Ho Park, Cheonan-si (KR); Yoon-Jang Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/691,272

(22) Filed: Nov. 30, 2012

(65) Prior Publication Data

US 2013/0102218 A1    Apr. 25, 2013

Related U.S. Application Data

(62) Division of application No. 12/731,043, filed on Mar. 24, 2010, now Pat. No. 8,345,178.

(30) Foreign Application Priority Data

Oct. 13, 2009   (KR) .......................... 10-2009-0097443

(51) Int. Cl.
*G02F 1/1333*    (2006.01)
*G02F 1/1343*    (2006.01)
*G02F 1/136*     (2006.01)
*G02F 1/13*      (2006.01)
*G09G 3/36*      (2006.01)

(52) U.S. Cl.
USPC .................. 349/55; 349/48; 349/192; 345/93

(58) Field of Classification Search
USPC ............................ 349/54, 55, 192, 48; 345/93
See application file for complete search history.

(56) References Cited

U.S. PATENT DOCUMENTS

2005/0270435 A1*   12/2005   Shiau et al. ..................... 349/54
2006/0274008 A1    12/2006   Lin et al.
2009/0027578 A1*   1/2009    You et al. ......................... 349/39
2009/0115925 A1*   5/2009    Park et al. ........................ 349/41

\* cited by examiner

*Primary Examiner* — Edward Glick
*Assistant Examiner* — Dennis Y Kim
(74) *Attorney, Agent, or Firm* — Signe Holmbeck

(57) ABSTRACT

A liquid crystal display includes a plurality of data lines and a plurality of pixels arranged in a matrix, wherein the plurality of pixels include a first pixel and a second pixel, and each of the first pixel and the second pixel includes a first subpixel electrode and a second subpixel electrode, a first switching element, a second switching element, a third switching element, and a voltage-changing capacitor, wherein a first source electrode on the first switching element and a second source electrode on the second switching element from the first pixel are connected to a data line, the first source electrode and the second source electrode of the second pixel are disconnected from the plurality of data lines, and the two terminals of the voltage-changing capacitor of the second pixel are shorted to each other.

16 Claims, 12 Drawing Sheets

LIQUID CRYSTAL DISPLAY AND REPAIRING METHOD THEREOF

CROSS-REFERENCE TO RELATED APPLICATION

This application is a divisional application of U.S. patent application Ser. No. 12/731,043 filed on Mar. 24, 2010, claims priority to and the benefit of Korean Patent Application No. 10-2009-0097443 filed on Oct. 13, 2009, in the Korean Intellectual Property Office (KIPO), and all the benefits accruing therefrom under 35 U.S.C. §119, the contents of the prior applications being herein incorporated by reference.

BACKGROUND OF THE INVENTION (a) Field of the Invention

The present invention relates to a liquid crystal display and a repairing method thereof.

(b) Description of the Related Art

One of the most widely used flat panel displays, a liquid crystal display (LCD) includes two display panels, each provided with field generating electrodes such as pixel electrodes and a common electrode, and a liquid crystal (LC) layer interposed therebetween. The LCD displays images by applying voltages to the field-generating electrodes on the display panel to generate an electric field across the LC layer. The electric field across the LC layer determines the orientation of LC molecules therein to adjust the polarization of incident light.

The liquid crystal layer includes a liquid crystal material having refractive anisotropy. Because of the refractive anisotropy of the liquid crystal material however, large differences in the color and the contrast ratio can occur between different viewing angles of the liquid crystal display, such that side visibility may be inferior to front visibility, thereby narrowing the viewing angle of the liquid crystal display. To solve this problem, a method has been proposed in which one pixel electrode is divided into two subpixel electrodes, and the two subpixel electrodes are applied with different voltages. Each subpixel electrode is connected to a thin film transistor as a three terminal element for switching the applied voltage.

However, in the process for manufacturing the liquid crystal display, deterioration of the channel of the thin film transistor can occur when impurities are introduced, or when the light used to form a photosensitive film for patterning a conductive layer is not suitably focused. Such deterioration can cause a subpixel electrode that is not to be applied with the data voltage, to be applied with the data voltage, such that the display quality deteriorates.

The above information disclosed in this Background section is only for enhancement of understanding of the background of the invention and therefore it may contain information that does not form the prior art that is already known to a person of ordinary skill in the art.

SUMMARY OF THE INVENTION

A liquid crystal display according to one aspect includes a plurality of data lines and a plurality of pixels arranged in a matrix, wherein the plurality of pixels include a first pixel and a second pixel, and each of the first pixel and the second pixel includes a first subpixel electrode and a second subpixel electrode, a first switching element including a first drain electrode connected to the first subpixel electrode and a first source electrode facing the first drain electrode, a second switching element including a second drain electrode connected to the second subpixel electrode and a second source electrode facing the second drain electrode, a third switching element including a third source electrode connected to the second drain electrode and a third drain electrode facing the third source electrode, and a voltage-changing capacitor including the third drain electrode and a common voltage line transmitting a common voltage as its two terminals, wherein the first source electrode and the second source electrode of the first pixel are connected to a data line of the plurality of data lines, the first source electrode and the second source electrode of the second pixel are disconnected from any of the plurality of data lines, and the two terminals of the voltage-changing capacitor of the second pixel are shorted to each other.

The liquid crystal display further includes a plurality of first gate lines, wherein one first gate line_is connected to the first switching element and the second switching element of the first pixel and one first gate line_is connected to the first switching element and the second switching element of the second pixel, and a plurality of second gate lines, wherein one second gate line is connected to the third switching element of the first pixel and one second gate line is connected to the third switching element of the second pixel.

The first subpixel electrode of the second pixel may be electrically connected to the first source electrode of the second pixel regardless of, that is, independently of, a gate signal of the first gate line.

The second subpixel electrode of the second pixel may be electrically connected to the second source electrode of the second pixel regardless of a gate signal of the first gate line.

The second gate line may be applied with a gate-off voltage Voff when the first gate line is applied with a gate-on voltage Von, and the first gate line may be applied with the gate-off voltage Voff when the second gate line is applied with the gate-on voltage Von.

In the first pixel, the voltages of the first subpixel electrode and the second subpixel electrode may be changed when the second gate line is applied with the gate-on voltage Von.

In the second pixel, the common voltage may be transmitted to the second subpixel electrode when the second gate line is applied with the gate-on voltage Von.

In the second subpixel, the first subpixel electrode may be electrically connected to the second subpixel electrode when the first gate line is applied with the gate-on voltage Von.

In the second subpixel, the second subpixel electrode may be applied with the common voltage when the second gate line is applied with the gate-on voltage Von.

In the second pixel, the common voltage may be transmitted to the second subpixel electrode.

The common voltage may be also transmitted to the first subpixel electrode in the second pixel.

A method for repairing a liquid crystal display according to one aspect is provided. The liquid crystal display including a plurality of data lines and a first pixel and a second pixel, wherein the first pixel and the second pixel respectively include a first subpixel electrode and a second subpixel electrode, a first switching element including a first drain electrode connected to the first subpixel electrode and a first source electrode facing the first drain electrode, a second switching element including a second drain electrode connected to the second subpixel electrode and a second source electrode facing the second drain electrode, a third switching element including a third source electrode connected to the second drain electrode and a third drain electrode facing the third source electrode, and a voltage-changing capacitor including the third drain electrode and a common voltage line transmitting a common voltage as its two terminals, the method including disconnecting the first source electrode and the second source electrode of the second pixel from any of the plurality of data lines, and shorting the two terminals of the voltage-changing capacitor in the second pixel.

The first source electrode and the second source electrode of the first pixel may be connected to a data line of the plurality of data lines.

The liquid crystal display may further include a plurality of first gate lines, wherein one first gate line is connected to the first switching element and the second switching element of the first pixel and one first gate line is connected to the first switching element and the second switching element of the second pixel, and a plurality of second gate lines, wherein one second gate line is connected to the third switching element of the first pixel and one second gate line is connected to the third switching element of the second.

The first subpixel electrode of the second pixel may be electrically connected to the first source electrode of the second pixel regardless of a gate signal of the first gate line.

The second subpixel electrode of the second pixel may be electrically connected to the second source electrode of the second pixel regardless of a gate signal of the first gate line.

The second gate line may be applied with the gate-off voltage Voff when the first gate line is applied with the gate-on voltage Von, and the first gate line may be applied with the gate-off voltage Voff when the second gate line is applied with the gate-on voltage Von.

In the first pixel, the voltages of the first subpixel electrode and the second subpixel electrode may be changed when the second gate line is applied with the gate-on voltage Von.

In the second pixel, the common voltage may be transmitted to the second subpixel electrode when the second gate line is applied with the gate-on voltage Von.

In the second pixel, the first subpixel electrode may be electrically connected to the second subpixel electrode when the first gate line is applied with the gate-on voltage Von.

In the second pixel, the first subpixel electrode may also be applied with the common voltage when the second gate line is also applied with the gate-on voltage Von.

In the second pixel, the common voltage may be transmitted to the second subpixel electrode.

The common voltage may also be transmitted to the first subpixel electrode in the second pixel.

At least one of the disconnecting of the first source electrode and the second source electrode of the second pixel from any of the plurality of data lines and the shorting of the two terminals of the voltage-changing capacitor in the second pixel may comprise using a laser.

DESCRIPTION OF REFERENCE NUMERALS INDICATING PRIMARY ELEMENTS IN THE DRAWINGS

Figure 1:
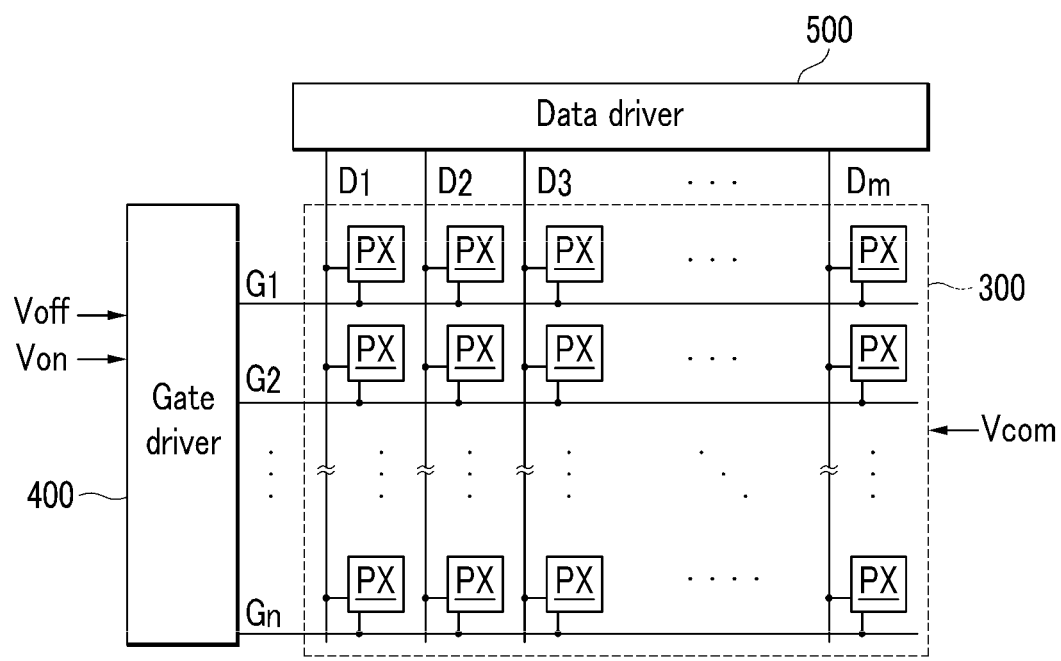
FIG. 1 is a block diagram of a liquid crystal display according to an exemplary embodiment.

| | |
|---|---|
| 3: | liquid crystal layer |
| 71: | cutout |
| 100: | lower panel |
| 110, 210: | substrate |
| 121: | first gate line |
| 123: | second gate line |
| 124l, 124h, 124c: | gate electrode |
| 125: | common voltage line |
| 140: | gate insulating layer |
| 151, 154, 154h, 154l, 154c: | semiconductor |
| 161, 163l, 165l, 163h, 165h: | ohmic contact |
| 171: | data line |
| 173h, 173l, 173c: | source electrode |
| 175h, 175l, 175c: | drain electrode |
| 180, 180p, 180q: | passivation layer |
| 185, 185h, 185l: | contact hole |
| 191, 191h, 191l: | pixel electrode |
| 200: | upper panel |
| 220: | light blocking member |
| 230: | color filter |
| 250: | overcoat |
| 270: | common electrode |

DETAILED DESCRIPTION OF THE EMBODIMENTS

The embodiments will be described more fully hereinafter with reference to the accompanying drawings. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as, for example, a layer, film, region, or substrate is referred to as being "on" another element, it can be directly on the other element, or intervening elements may also be present. In contrast, when an element is referred to as being "directly on" another element, there are no intervening elements present.

Now, a liquid crystal display according to an exemplary embodiment will be described with reference to FIG. 1 and FIG. 2.

Figure 2:
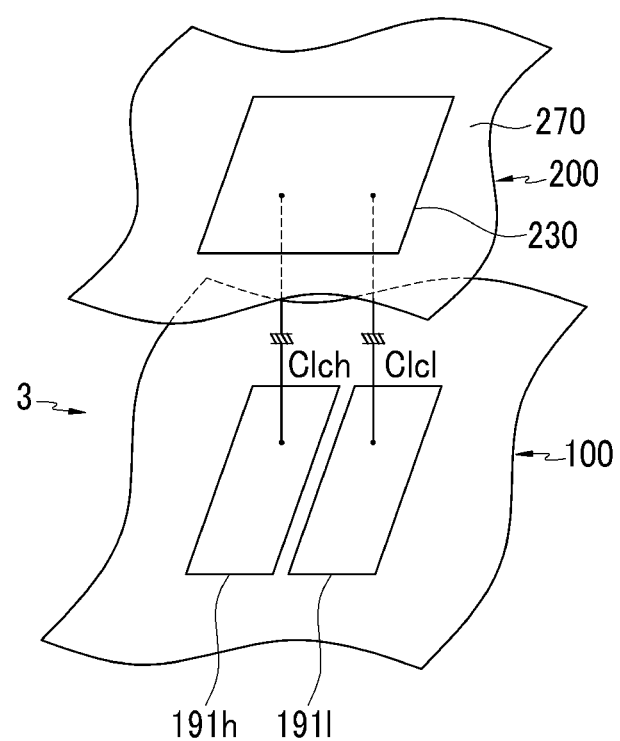
FIG. 2 is an equivalent circuit diagram of two subpixels and a structure of a liquid crystal display according to an exemplary embodiment.

FIG. 1 is a block diagram of a liquid crystal display according to an exemplary embodiment, and FIG. 2 is an equivalent circuit diagram of two subpixels and a structure of a liquid crystal display according to an exemplary embodiment.

Referring to FIG. 1, a liquid crystal display according to an exemplary embodiment includes a liquid crystal panel assembly 300, a gate driver 400, and a data driver 500.

In an equivalent circuit of the liquid crystal panel assembly 300, the liquid crystal panel assembly 300 includes a plurality of signal lines G1-Gn and D1-Dm, and a plurality of pixels PX arranged in an approximate matrix. In the structure shown in FIG. 2, the liquid crystal panel assembly 300 includes a lower panel 100 and an upper panel 200 that are facing each other, and a liquid crystal layer 3 interposed therebetween.

The signal lines G1-Gn and D1-Dm that are provided in the lower panel 100 include a plurality of gate lines G1 to Gn for transmitting gate signals (referred to as "scanning signals") and a plurality of data lines D1 to Dm for transmitting a data voltage.

Each pixel PX, for example the pixel PX connected to the i-th (i=1, 2, . . . , n) gate line Gi and the j-th (j=1, 2, . . . , m) data line Dj, includes a first subpixel and a second subpixel. The first and second subpixels respectively include first and second liquid crystal capacitors Clch and Clcl. The first and second subpixels further include a switching element (not shown) connected to the gate lines G1-Gn, the data lines D1-Dm, and the first and second liquid crystal capacitors Clch and Clcl.

The first and second liquid crystal capacitor Clch and Clcl include a first and second subpixel electrode 191h and 191l, respectively, on the lower panel 100 and a common electrode 270 on the upper panel 200 as two terminals. The liquid crystal layer 3 between the two terminals serves as a dielectric material. The first and second subpixel electrodes 191h and 191l are separated from each other and form one pixel electrode 191. The common electrode 270 is formed on the whole surface of the upper panel 200 and is applied with the common voltage Vcom. The liquid crystal layer 3 has negative dielectric anisotropy, and liquid crystal molecules of the liquid crystal layer 3 may be aligned such that their major axes are perpendicular to the surfaces of the two display panels when an electric field is not applied. In an alternative to the structure illustrated in FIG. 2, the common electrode 270 may be formed on the lower panel 100.

For the color display, each pixel PX uniquely displays one of three primary colors (spatial division) or each pixel PX alternately displays the three primary colors (temporal division) as time passes, and a desired color is recognized by a spatial or temporal sum of the primary colors. For example, the primary colors may be three primary colors of red, green, and blue. FIG. 2 shows a color filter 230 displaying one of the primary colors on a region of the upper panel 200 for each of the pixels as an example of spatial division. In an alternative to the case illustrated in FIG. 2, the color filter 230 may be provided on or under the subpixel electrodes 191h and 191l of the lower panel 100.

Polarizers (not shown) may be provided on the outer surface of the display panels 100 and 200, and the polarization axes of the two polarizers may be crossed.

Referring again to FIG. 1, the data driver 500 is connected to the data lines D1-Dm of the liquid crystal panel assembly 300, and applies the data voltage to the data lines D1-Dm.

The gate driver 400 is connected to the gate lines G1 to Gn of the liquid crystal panel assembly 300, and applies gate signals obtained by combining a gate-on voltage Von for turning on a switching element and a gate-off voltage Voff for turning off the switching element to the gate lines G1 to Gn.

Next, one example of the liquid crystal display will be described with reference to FIG. 3 as well as FIG. 1 and FIG. 2.

Figure 3:
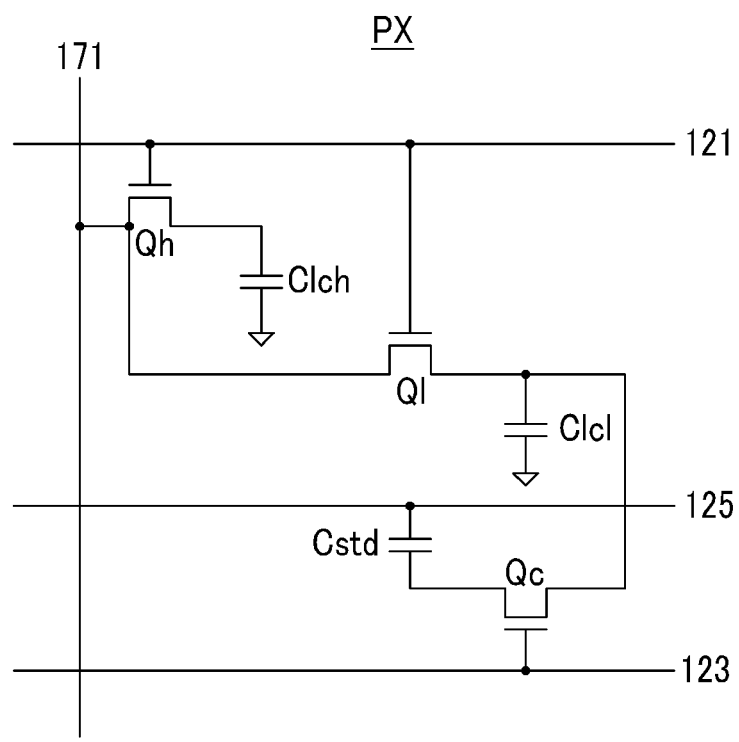
FIG. 3 is an equivalent circuit diagram of one pixel of a liquid crystal display according to an exemplary embodiment.

FIG. 3 is an equivalent circuit diagram of one pixel of a liquid crystal display according to an exemplary embodiment.

Referring to FIG. 3, a liquid crystal display according to an exemplary embodiment has signal lines that include a first gate line 121, a second gate line 123, a common voltage line 125, and a data line 171, and a plurality of pixels PX connected thereto.

The pixel PX includes a first switching element Qh, a second switching element Ql, a third switching element Qc, a first liquid crystal capacitor Clch, a second liquid crystal capacitor Clcl, and a voltage-changing capacitor Cstd.

The first and second thin film transistors Qh and Ql are three terminal elements provided in the lower panel 100 and have a control terminal connected to the gate line 121, an input terminal connected to the data line 171, and an output terminal connected to the first and second liquid crystal capacitors Clch and Clcl, respectively.

The third thin film transistor Qc is a three terminal element provided in the lower panel 100 and has a control terminal connected to the second gate line 123, an input terminal connected to the second liquid crystal capacitor Clcl, and an output terminal connected to the voltage-changing capacitor Cstd.

The voltage-changing capacitor Cstd is connected to the output terminal of the third switching element Qc and the common voltage line 125. The common voltage line 125 provided in the lower panel 100 and the output terminal of the third switching element Qc overlap via an insulator.

The first liquid crystal capacitor Clch and the second liquid crystal capacitor Clcl are described above such that redundant description is omitted.

An operation of a liquid crystal display according to an exemplary embodiment will be described with reference to FIG. 4 as well as FIG. 1 to FIG. 3.

Figure 4:
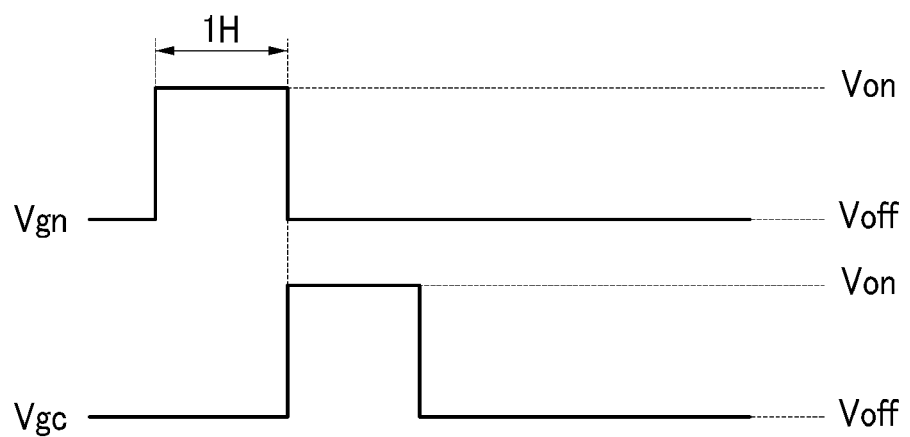
FIG. 4 is illustrates a gate signal of a liquid crystal display according to an exemplary embodiment.

FIG. 4 is a view showing a gate signal Vgn of the first gate line 121 and a gate signal Vgc of the second gate line 123 in the liquid crystal display shown in FIG. 3.

If the first gate line 121 is applied with a gate-on voltage Von, the first switching element Qh and the second switching element Ql connected thereto are turned on.

Accordingly, the data voltage of the data line 171 is simultaneously applied to both the first and second subpixel electrodes 191h and 191l through the turned-on first and second switching elements Qh and Ql. The first and second liquid crystal capacitors Clch and Clcl are charged by a difference between the common voltage Vcom of the common electrode 270 and the voltage of the first and second subpixel electrodes 191h and 191l, such that the charging voltage of the first liquid crystal capacitor Clch is the same as the charging voltage of the second liquid crystal capacitor Clcl. In this case, the second gate line 123 is applied with the gate-off voltage Voff.

Next, if the first gate line 121 is applied with the gate-off voltage Voff, and simultaneously the second gate line 123 is applied with the gate-on voltage Von, the first and second switching elements Qh and Ql connected to the gate line 121 are turned off, and the third switching element Qc is turned on. Accordingly, the charges of the second subpixel electrode 191l connected to the output terminal of the second switching element Ql flow into the voltage-changing capacitor Cstd such that the voltage of the second liquid crystal capacitor Clcl is decreased.

In an example of the case in which the liquid crystal display according to the present exemplary embodiment is driven by frame inversion, when the data line 171 has the positive data voltage with respect to the common voltage Vcom in the present frame, negative charges are gathered in the voltage-changing capacitor Cstd after the previous frame is finished. Accordingly, in the present frame, if the third switching element Qc is turned on, the positive charges of the second subpixel electrode 191*l* flow into the voltage-changing capacitor Cstd through the third switching element Qc, and the negative charges of the voltage-changing capacitor Cstd flow into the second subpixel electrode 191*l* such that the voltage of the second subpixel electrode 191 is decreased. Next, in the immediately following frame, if the third switching element Qc is turned on in the state in which the negative charges are charged in the second subpixel electrode 191*l*, the negative charges of the second subpixel electrode 191*l* flow into the voltage-changing capacitor Cstd such that the negative charges are gathered in the voltage-changing capacitor Cstd, and the voltage of the second liquid crystal capacitor Clcl is decreased.

Accordingly, the charging voltages of the first and second liquid crystal capacitors Clch and Clcl are different such that the lateral visibility of the liquid crystal display may be improved.

A liquid crystal display according to an exemplary embodiment of the present invention and a manufacturing method thereof will be described with reference to FIG. 5 to FIG. 7.

Figure 5:
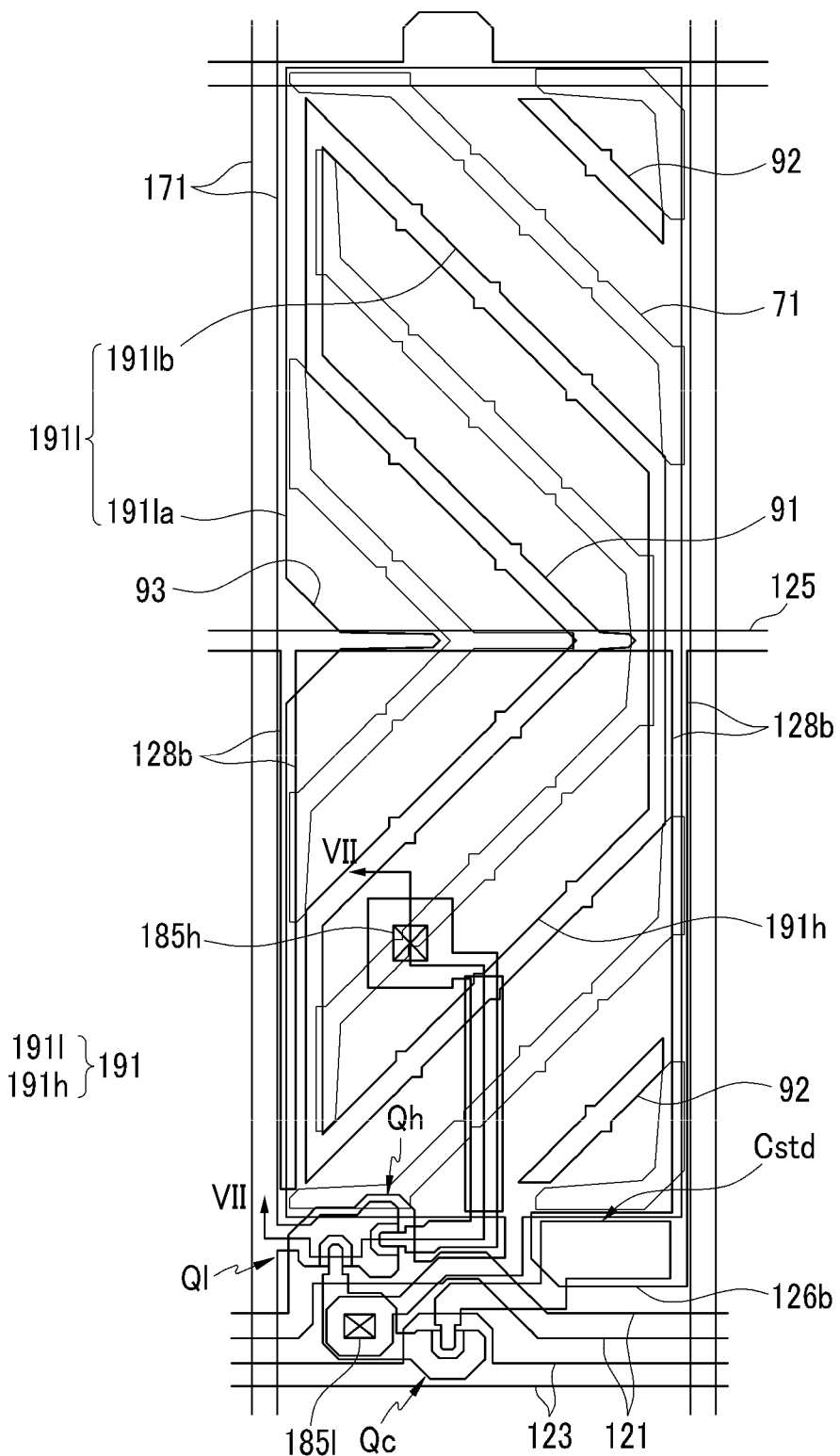
FIG. 5 is a layout view of a liquid crystal display according to an exemplary embodiment.
Figure 6:
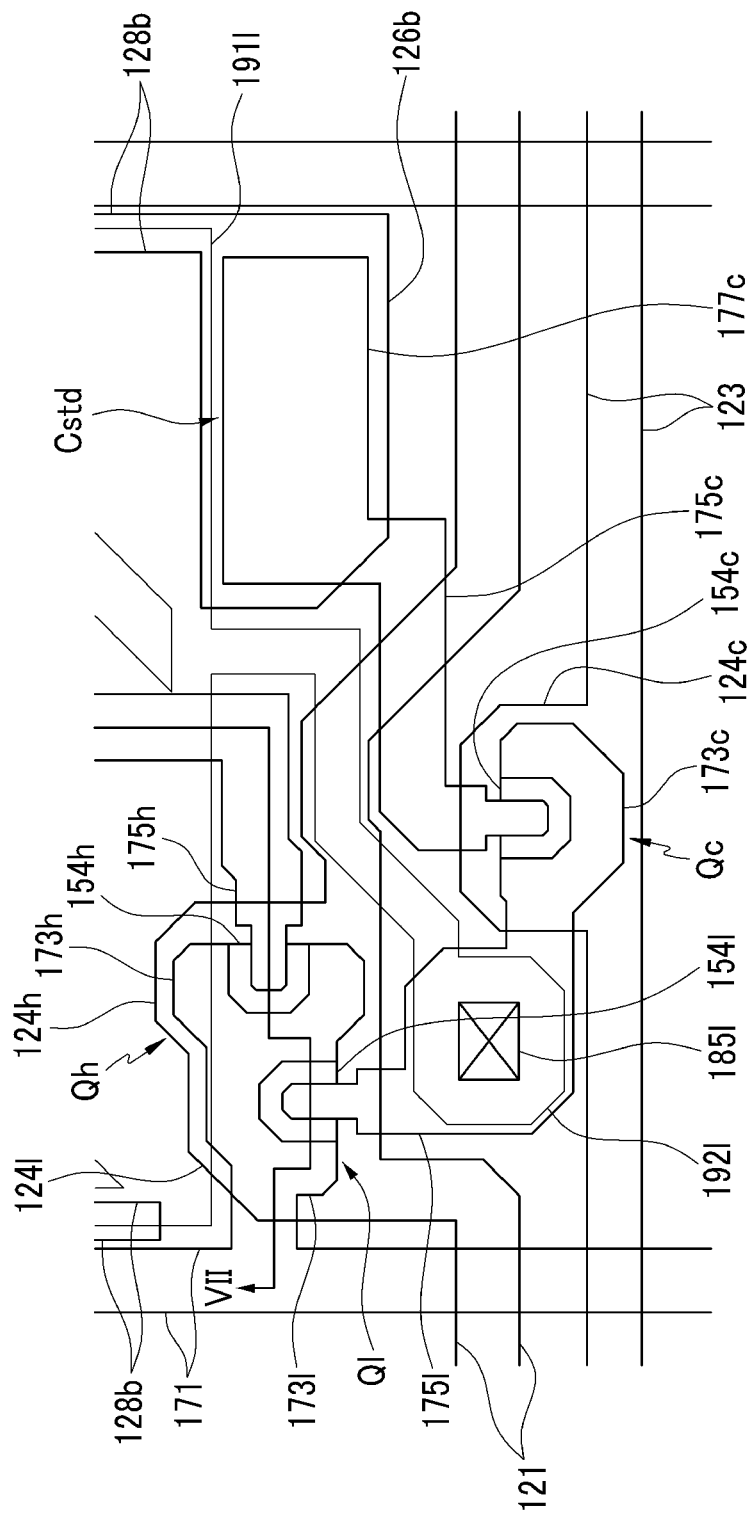
FIG. 6 is an enlarged view of a portion of the liquid crystal display shown in FIG. 5.
Figure 7:
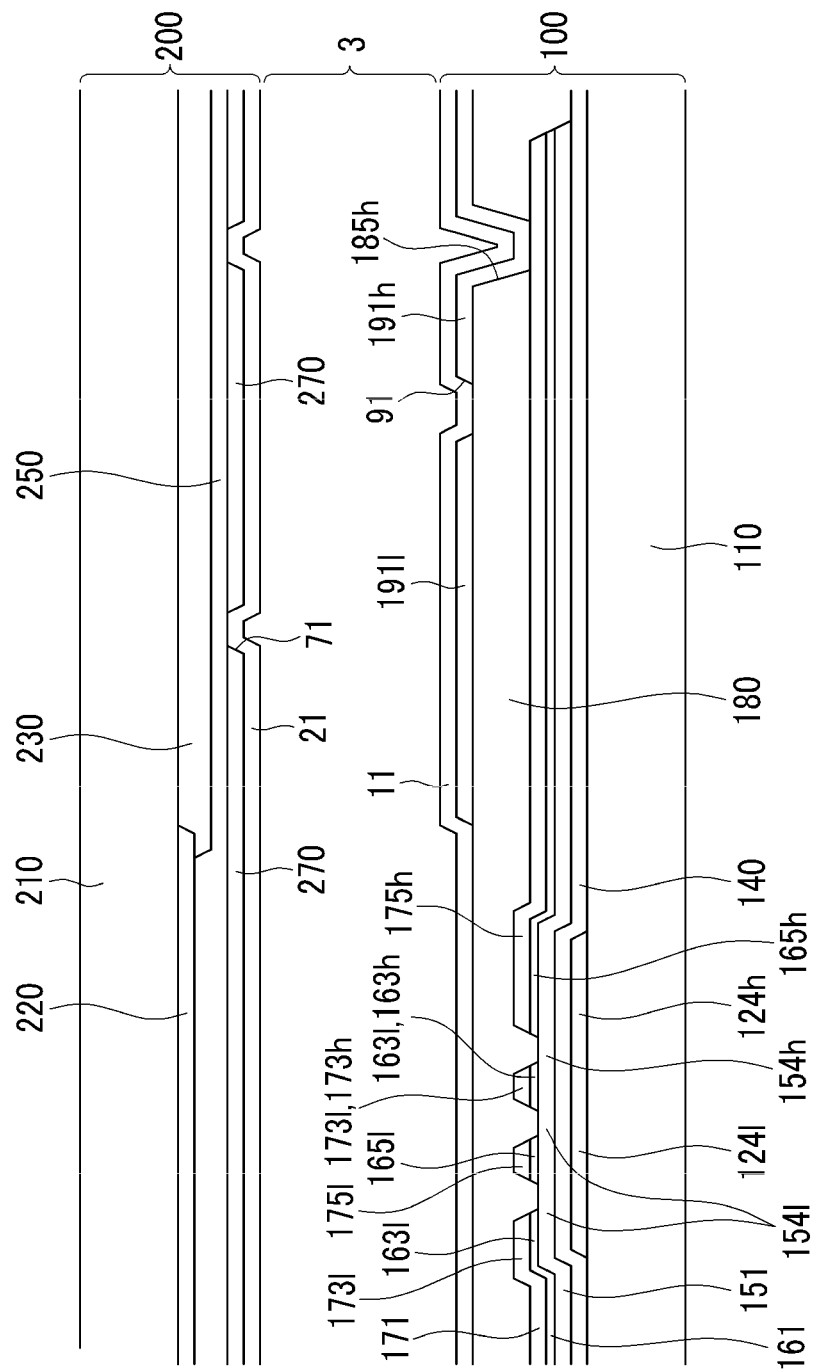
FIG. 7 is a cross-sectional view of the liquid crystal display shown in FIG. 5 and FIG. 6 taken along the line VII-VII.

FIG. 5 is a layout view of a liquid crystal display according to an exemplary embodiment, FIG. 6 is an enlarged view of a portion of the liquid crystal display shown in FIG. 5, and FIG. 7 is a cross-sectional view of the liquid crystal display shown in FIG. 5 and FIG. 6 taken along the line VII-VII.

The liquid crystal display according to the present exemplary embodiment includes the lower panel 100 and the upper panel 200 which are facing each other, and a liquid crystal layer 3 interposed between two display panels 100 and 200. Polarizers (not shown) may be provided at the outer surface of the display panels 100 and 200.

The lower panel 100 will now be described.

A plurality of gate conductors including a plurality of first gate lines 121, a plurality of second gate lines 123, and a common voltage line 125 are formed on an insulation substrate 110.

The first gate line 121 and the second gate line 123 extend in a substantially transverse direction and each transmits a gate signal. The first gate line 121 includes a first gate electrode 124*h* and a second gate electrode 124*l* that protrude upward, and the second gate line 123 includes a third gate electrode 124*c* that protrudes upward. The first gate electrode 124*h* and the second gate electrode 124*l* are connected to each other, thereby forming one protrusion.

The common voltage line 125 is mainly extended in the transverse direction, and transfers a predetermined voltage such as a common voltage Vcom. The common voltage line 125 includes left and right common voltage electrodes 128*b* that protrude downward, and an expansion 126*b* connected to the ends of the right common voltage electrode 128*b*.

A gate insulating layer 140 is formed on the gate conductors 121, 123, and 125.

A plurality of semiconductor stripes 151 made of amorphous silicon (a-Si), polysilicon, or the like are formed on the gate insulating layer 140. The semiconductor stripes 151 are mainly extended in the longitudinal direction.

Each semiconductor stripe 151 includes first and second semiconductors 154*h* and 154*l* that extend toward the first and second gate electrodes 124*h* and 124*l* and which are connected to each other, and a third semiconductor 154*c* connected to the second semiconductor 154*l*.

A plurality of ohmic contact stripes 161 are formed on the semiconductor stripes 151, a pair of ohmic contacts 163*h* and 165*h* are formed on the first semiconductor 154*h*, and a pair of ohmic contacts 163*l* and 165*l* are formed on the second semiconductor 154*l*. A pair of ohmic contacts (not shown) are also formed on the third semiconductor 154*c*. The ohmic contacts 163*l* and 163*h* are connected to the ohmic contact stripes 161.

A data conductor including a plurality of data lines 171, a plurality of first drain electrodes 175*h*, a plurality of second drain electrodes 175*l*, a plurality of third source electrodes 173*c*, and a plurality of third drain electrodes 175*c* is formed on the ohmic contacts 161, 165*h*, and 165*l*.

The data lines 171 transmit data signals and extend in the longitudinal direction thereby intersecting the first gate lines 121 and the second gate lines 123. Each data line 171 includes a first source electrode 173*h* and a second source electrode 173*l* extending, respectively, toward the first gate electrode 124*h* and the second gate electrode 124*l*. The first source electrode 173*h* and the second source electrode 173*l* are connected to each other.

The first drain electrode 175*h*, the second drain electrode 175*l*, and the third drain electrode 175*c* each have one end portion that has a wide area and the other end portion that has a linear, or bar shape. The bar-shaped end portions of the first drain electrode 175*h* and the second drain electrode 175*l* are partially enclosed by the first source electrode 173*h* and the second source electrode 173*l*, respectively. The bar-shaped end portion of the third source electrode 173*c* is partially enclosed by the third source electrode 173*c*. The wide end of the second drain electrode 175*l* is connected to the third source electrode 173*c*. The wide end 177*c* of the third drain electrode 175*c* overlaps the expansion 126*b* of the common voltage line 125, thereby forming the voltage-changing capacitor Cstd.

The first, second, and third gate electrodes 124*h*, 124*l*, and 124*c*, the first, second, and third source electrodes 173*h*, 173*l*, and 173*c*, and the first, second, and third drain electrodes 175*h*, 175*l*, and 175*c* form, respectively, the first, second, and third thin film transistors (TFT) Qh, Ql, and Qc along with the first, second, and third semiconductor islands 154*h*, 154*l*, and 154*c*. A channel of the thin film transistors is respectively formed in the semiconductor 154*h*, 154*l*, and 154*c* between the source electrodes 173*h*, 173*l*, and 173*c* and the drain electrodes 175*h*, 175*l*, and 175*c*.

Also, the semiconductor stripes 151 including the semiconductors 154*h*, 154*l*, and 154*c*, with the exception of the channel region between the source electrodes 173*h*, 173*l*, and 173*c*, and the drain electrodes 175*h*, 175*l*, and 175*c*, have substantially the same shape as the data conductors 171, 175*h*, 175*l*, and 175*c*, and the underlying ohmic contacts 161 and 165*h*. That is, the semiconductor stripes 151 including the semiconductors 154*h*, 154*l*, and 154*c* have a portion that is exposed without being covered by the data conductors 171, 175*h*, 175*l*, and 175*c*, and a portion between the source electrodes 173*h*, 173*l*, and 173*c* and the drain electrodes 175*h*, 175*l*, and 175*c*.

A passivation layer 180 is formed on the data conductors 171, 175*h*, 175*l* and 175*c* and the exposed semiconductors 154*h*, 154*l*, and 154*c*.

The passivation layer 180 has a plurality of contact holes 185*h* and 185*l* respectively exposing the wide end of the first drain electrode 175*h* and the wide end of the second drain electrode 175*l*.

A pixel electrode 191 is formed on the passivation layer 180.

The overall shape of pixel electrode 191 is substantially rectangular. Pixel electrode 191 includes the first and second subpixel electrodes 191h and 191l that are engaged with each other and have a gap 91 therebetween. The first subpixel electrode 191h is formed in the central portion of the second subpixel electrode 191l, and the gap 91 includes one longitudinal portion and a pair of oblique portions respectively disposed upward and downward with respect to an imaginary transverse central line (or the common voltage line 125).

The second subpixel electrode 191l includes a central electrode 191la, upper and lower electrodes 191lb, and a protrusion 192l that protrudes downward from the lower electrode 191lb. The central electrode 191la includes a cutout 93 that has a substantially triangular shape, and is formed in the central portion of the left edge of the central electrode. The upper and the lower electrodes 191b each include a cutout 92.

The edges of the oblique portion of the gap 91, and the cutouts 92 and 93, are inclined with respect to the first and second gate lines 121 and 123 and the common voltage line 125 by an angle of about 45°.

The number of cutouts may vary depending on design factors, such as the length ratio of the horizontal side and the vertical side of the pixel electrode 191, the type of liquid crystal layer 3, or other characteristics.

The area of the second subpixel electrode 191l may be in the range of 1.0 to 2.2 times the area of the first subpixel electrode 191h.

The first subpixel electrode 191h receives the data voltage from the first drain electrode 175h through the contact hole 185h, and the second subpixel electrode 191l receives the data voltage from the second drain electrode 175l through the protrusion 192l and the contact hole 185l.

An alignment layer 11 is formed on the first and second subpixel electrodes 191h and 191l and the passivation layer 180. The alignment layer 11 may be a vertical alignment layer.

Next, the upper panel 200 will be described.

A light blocking member 220 referred to as a black matrix and a plurality of color filters 230 are formed on an insulation substrate 210, and an overcoat 250 is formed on the light blocking member 220 and the color filters 230.

A common electrode 270 made of a transverse conductor or metal such as ITO or IZO is formed on the overcoat 250. The common electrode 270 has a plurality of cutouts 71 formed substantially parallel to the oblique portions of the cutouts 92 of the pixel electrode 191.

An alignment layer 21 may be formed on the common electrode 270. The alignment layer 21 may be a vertical alignment layer.

The liquid crystal layer 3 between the lower panel 100 and the upper panel 200 includes liquid crystal molecules having dielectric anisotropy, and may be oriented such that the major axes of the liquid crystal molecules of the liquid crystal layer 3 are almost perpendicular to the surfaces of the two display panels 100 and 200 when no electric field is applied.

The first and second subpixel electrodes 191h and 191l applied with the data voltage form the electric field along with the common electrode 270 of the upper panel 200 such that the electric field determines the direction of the liquid crystal molecules in the liquid crystal layer 3 between two electrodes 191 and 270. The degree of change of the polarization of the light that is incident to the liquid crystal layer 3 depends upon the inclination degree of the liquid crystal molecules, and this change of the polarization appears as a change of transmittance by the polarizer, thereby displaying images of the liquid crystal display.

The first subpixel electrode 191h and the common electrode 270 form the first liquid crystal capacitor Clch along with the liquid crystal layer 3 interposed therebetween, and the second subpixel electrode 191l and the common electrode 270 form the second liquid crystal capacitor Clcl along with the liquid crystal layer 3 interposed therebetween, thereby maintaining the voltage of the subpixel electrodes after the first and second thin film transistors Qh and Ql are turned off.

After the first and the second thin film transistors Qh and Ql are turned off, the third thin film transistor Qc is turned on such that the second liquid crystal capacitor Clcl is connected to the voltage-changing capacitor Cstd, and thereby the voltage of the second liquid crystal capacitor Clcl is decreased. If the voltages of the first and second liquid crystal capacitors Clch and Clcl are different, the luminances of the display at the first subpixel 191h and the second subpixel electrode 191l are also different, and accordingly, the voltages of the first and second liquid crystal capacitors Clca and Clcb are appropriately controlled, thereby improving the lateral visibility. Various characteristics and operations of the liquid crystal display according to the exemplary embodiments shown in FIG. 1 to FIG. 4 may also be applied to the present exemplary embodiment.

Next, a manufacturing method of a lower panel 100 of the liquid crystal display shown in FIG. 5 to FIG. 7 will be described.

First, a gate conductive layer (not shown) is deposited on an insulation substrate 110 made of transparent glass, and a photosensitive film is coated thereon. The photosensitive film is irradiated by light through a mask (not shown) and is developed to form a photosensitive film pattern (not shown), and the gate conductive layer is etched by using the photosensitive film pattern as an etching mask to form a plurality of gate conductors including a plurality of first gate lines 121, a plurality of second gate lines 123, and a common voltage line 125.

Next, a gate insulating layer 140 made of an inorganic insulator or an organic insulator is deposited on the gate conductor.

Next, a semiconductor layer (not shown) and a semiconductor layer (not shown) that is doped with an impurity are sequentially deposited by chemical vapor deposition on the gate insulating layer 140, a data conductive layer (not shown) is formed by sputtering, and a photosensitive film is coated thereon. Next, the photosensitive film is irradiated by light using a light exposer through a mask (not shown), and is developed to form a photosensitive film pattern (not shown) which has different thicknesses in different positions. Next, the data conductive layer, the semiconductor layer doped with an impurity, and the semiconductor layer are etched by using the photosensitive film pattern as the etching mask to form a data conductor layer (not shown), an ohmic contact layer (not shown), and a plurality of semiconductor stripes 151 having the same plane shape.

Next, a portion of the photosensitive film pattern is removed, and the exposed data conductor layer and ohmic contact layer are etched to form (i) the channel regions of the first, second, and third thin film transistors Qh, Ql, and Qc, and (ii) a data conductor that includes a plurality of data lines 171, a plurality of first drain electrodes 175h, a plurality of second drain electrodes 175l, a plurality of third source electrodes 173c, and a plurality of third drain electrodes 175c, and a plurality of ohmic contacts 161, 165h, and 165l.

Next, a passivation layer 180 is formed on the data conductor and patterned to form a plurality of contact holes 185h and 185l, and a transparent conductive layer of IZO or ITO is formed on the passivation layer 180 by sputtering, and then patterned to form a plurality of pixel electrodes 191 including a gap 91 and cutouts 92 and 93.

In the manufacturing process of the liquid crystal display, forming the first, second, and third gate electrodes 124h, 124l, and 124c, the first, second, and third semiconductors 154h, 154l, and 154c, the first, second, and third source electrodes 173h, 173l, and 173c, and the first, second, and third drain electrodes 175h, 175l, and 175c, which form the first, second, and third thin film transistors Qh, Ql, and Qc requires exposing the liquid crystal display to light. As the result of various causes in the manufacturing of the liquid crystal display, for instance if the light used is not appropriately focused or is misaligned, or if external foreign particles are introduced into the display device, defects can occur in the channel regions of the first, second, and third thin film transistors Qh, Ql, and Qc. As a result of such defects, the first, second, and third thin film transistors Qh, Ql, and Qc may always be turned on, regardless of the state of the gate signal. Particularly, if the first and second thin film transistors Qh and Ql that are connected to the first and second subpixel electrodes 191h and 191l and applied with the data voltage are defective, the first and second subpixel electrodes 191h and 191l may be applied with the data voltage for the different pixels PX such that the image of the corresponding pixel PX may not be displayed. Accordingly, the deteriorated pixel PX is repaired to always display black. Particularly, referring to FIG. 5 to FIG. 7, the first thin film transistor Qh and the second thin film transistor Ql are close to each other such that they may be simultaneously defective.

Next, a method for repairing a defective pixel that may occur in the liquid crystal display shown in FIG. 5 to FIG. 7, and the resulting repaired liquid crystal display will be described with reference to FIG. 8 to FIG. 11. In FIG. 8 to FIG. 11, the same constituent elements as described in the previous exemplary embodiment are indicated by the same reference numerals. Certain redundant description is therefore omitted.

Figure 8:
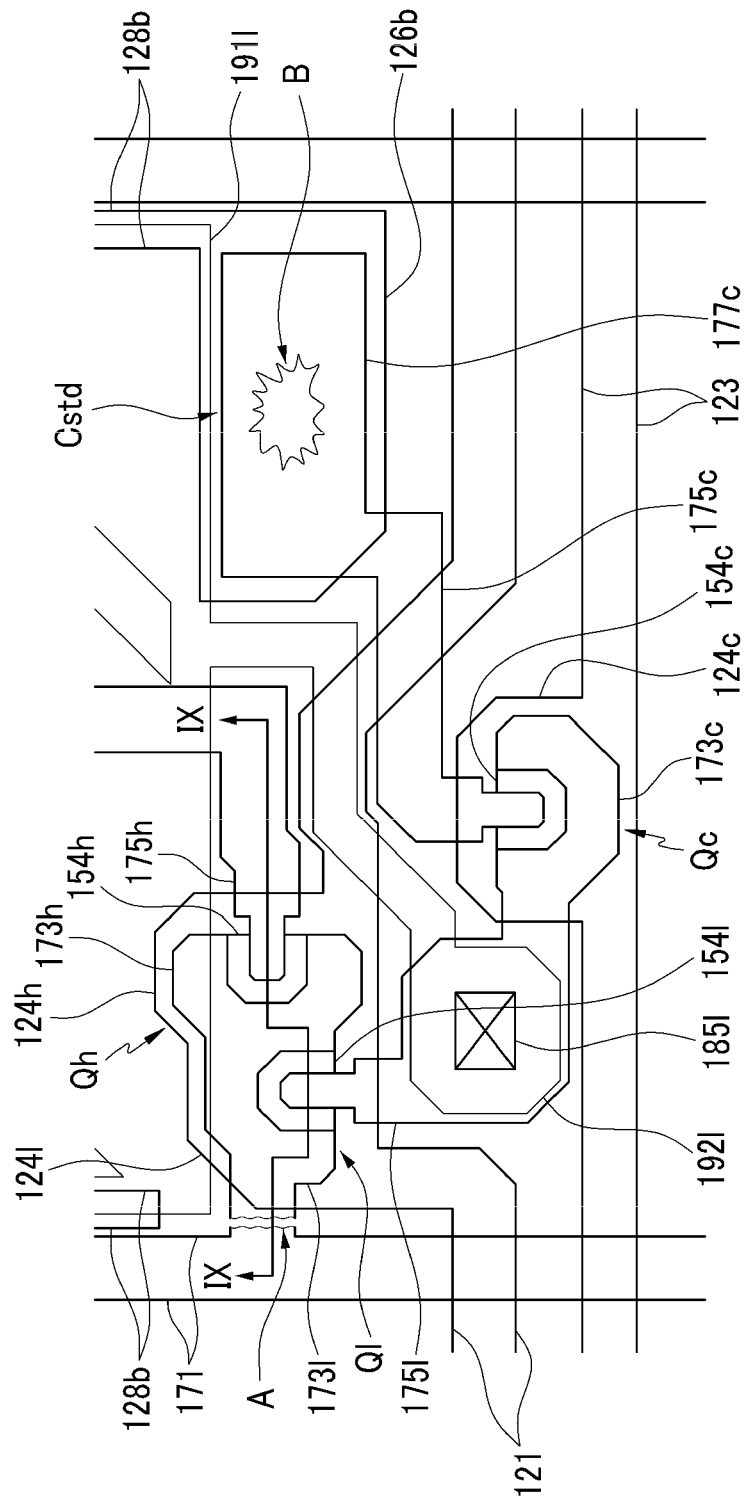
FIG. 8 is a layout view of a repaired pixel of a liquid crystal display according to an exemplary embodiment.
Figure 9:
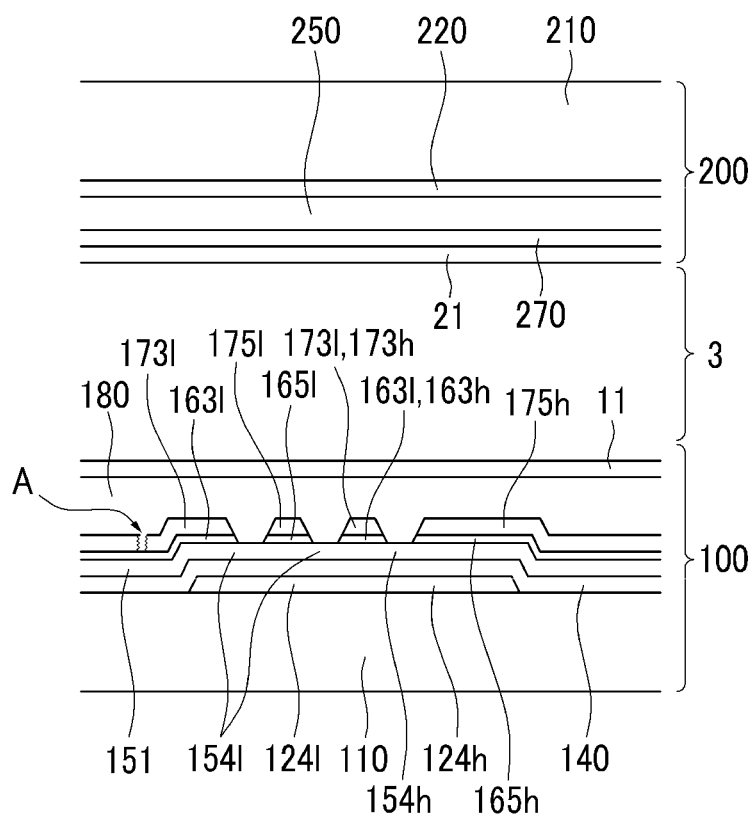
FIG. 9 is a cross-sectional view of the liquid crystal display shown in FIG. 8 taken along the line IX-IX.
Figure 10:
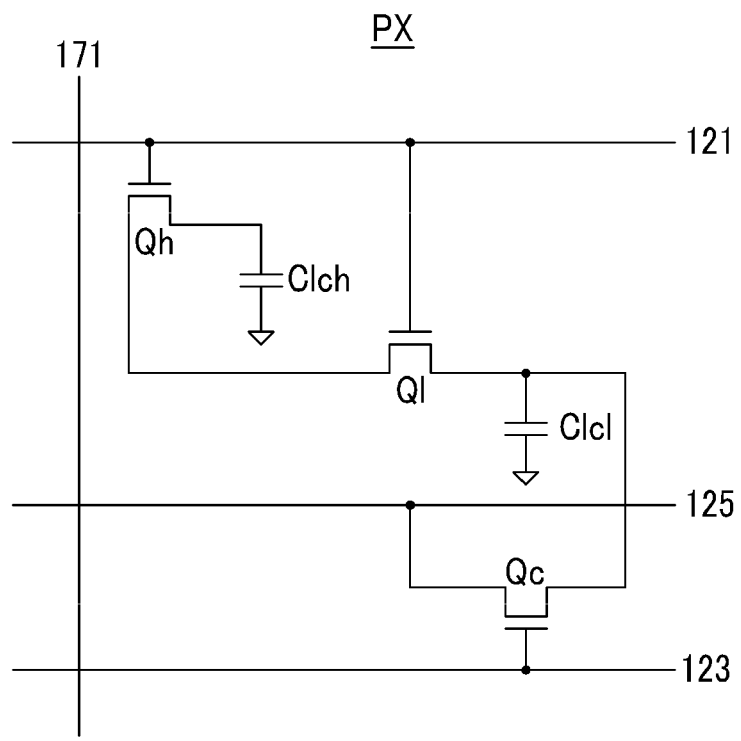
FIG. 10 is an equivalent circuit diagram of a repaired pixel of the liquid crystal display according to an exemplary embodiment.
Figure 11:
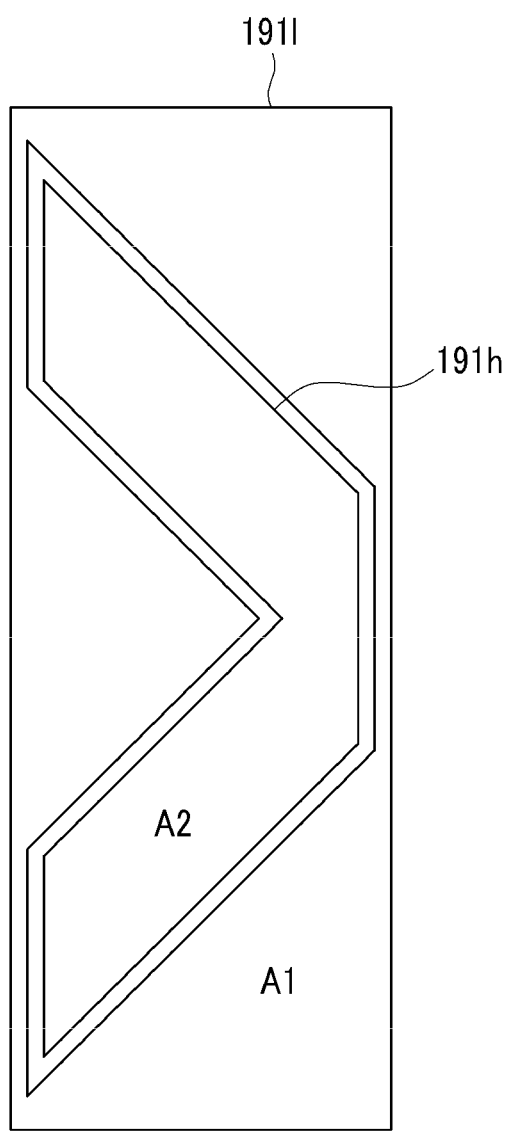
FIG. 11 is a view showing two subpixel electrodes and a display area of a liquid crystal display according to an exemplary embodiment.

FIG. 8 is a layout view of a repaired pixel of a liquid crystal display according to an exemplary embodiment, FIG. 9 is a cross-sectional view of the liquid crystal display shown in FIG. 8 taken along the line IX-IX, FIG. 10 is an equivalent circuit diagram of a repaired pixel of the liquid crystal display according to an exemplary embodiment, and FIG. 11 is a view showing two subpixel electrodes and a display area of a liquid crystal display according to an exemplary embodiment.

Referring to FIG. 8 to FIG. 10, when the first thin film transistor Qh of the pixel of the liquid crystal display according to an exemplary embodiment is defective, or the first and second thin film transistors Qh and Ql are defective, the portion A between the first source electrode 173h of the first thin film transistor Qh and the data line 171 is disconnected by, for example, using a laser, and the wide end 177c of the third drain electrode 175c and the expansion 126b of the common voltage line 125 forming two terminals of the voltage-changing capacitor Cstd are shorted (portion B) by using, for example, a laser.

Thus, the first and second thin film transistors Qh and Ql are separated from the data line 171 such that they do not receive the data voltage, and the function of the voltage-changing capacitor Cstd is lost. The third drain electrode 175c of the third thin film transistor Qc is directly connected to the common voltage Vcom. Accordingly, if the gate-on voltage Von is applied to the second gate line 123, thereby turning on the third thin film transistor Qc, the common voltage Vcom is applied to the second subpixel electrode 191l through the contact hole 185l such that the voltage applied to the second liquid crystal capacitor Clcl is substantially 0. As a result, therefore, the first display area A1 corresponding to the second subpixel electrode 191l of FIG. 11 displays black. In FIG. 11, the first display area A1 is an image display area corresponding to the second subpixel electrode 191l, and the second display area A2 is the image display area corresponding to the first subpixel electrode 191h.

On the other hand, when the channel region of the third thin film transistor Qc is defective, the second subpixel electrode 191l is applied with the common voltage Vcom regardless of the gate signal Vgc of the second gate line 123 such that the first display area A1 of FIG. 11 may display black.

Next, if the gate-on voltage Von is applied to the first gate line 121, the first and the second thin film transistors Qh and Ql are turned on such that the first subpixel electrode 191h is connected to the second subpixel electrode 191l through the turned-on first and second thin film transistors Qh and Ql and the contact hole 185l. Accordingly, the voltage of the first subpixel electrode 191h is moved to the side of the common voltage Vcom, and the voltage of the first subpixel electrode 191h converges to the common voltage Vcom as the frame is repeated. Accordingly, the voltage applied to the first liquid crystal capacitor Clch is substantially 0 such that the second display area A2 corresponding to the first subpixel electrode 191h of FIG. 11 displays black.

When the channel regions of the first and second thin film transistors Qh and Ql are defective, the first and second thin film transistors Qh and Ql may always be turned on, regardless of the gate signal Vgn of the first gate line 121, such that the common voltage Vcom is simultaneously applied the first subpixel electrode 191h when the common voltage Vcom is applied to the second subpixel electrode 191l in this case.

When the third thin film transistor Qc is defective as well as the first and second thin film transistors Qh and Ql, the common voltage Vcom may be applied to both the first subpixel electrode 191h and the second subpixel electrode 191l regardless of the gate signal Vgn of the first gate line 121 and the gate signal Vgc of the second gate line 123.

As described above, when the pixel of the liquid crystal display is defective, for instance when defects in the first thin film transistor Qh or the first and second thin film transistors Qh and Ql exist, the pixel defect that causes an abnormally bright light is turned off so that the pixel displays black. This change is accomplished by easily repairing the corresponding pixel through the above-described method, and thereby display deterioration may be prevented.

In the above-described exemplary embodiment, the pixel defects due to a defect of the channel region of the first thin film transistor Qh and the second thin film transistor Ql is described. However the embodiment is not limited thereto, and the method of repairing the liquid crystal display according to the exemplary embodiments may be applied to various cases in which the second display area A2 corresponding to the first subpixel electrode 191h, or the first display area A1 corresponding to the second subpixel electrode 191l, does not execute the normal display operation.

Next, a method of repairing a liquid crystal display and a repaired pixel of a liquid crystal display according to another exemplary embodiment will be described with reference to FIG. 12 and FIG. 13. The same constituent elements described in the previous exemplary embodiment are indicated by the same reference numerals. Certain redundant description is therefore omitted.

Figure 12:
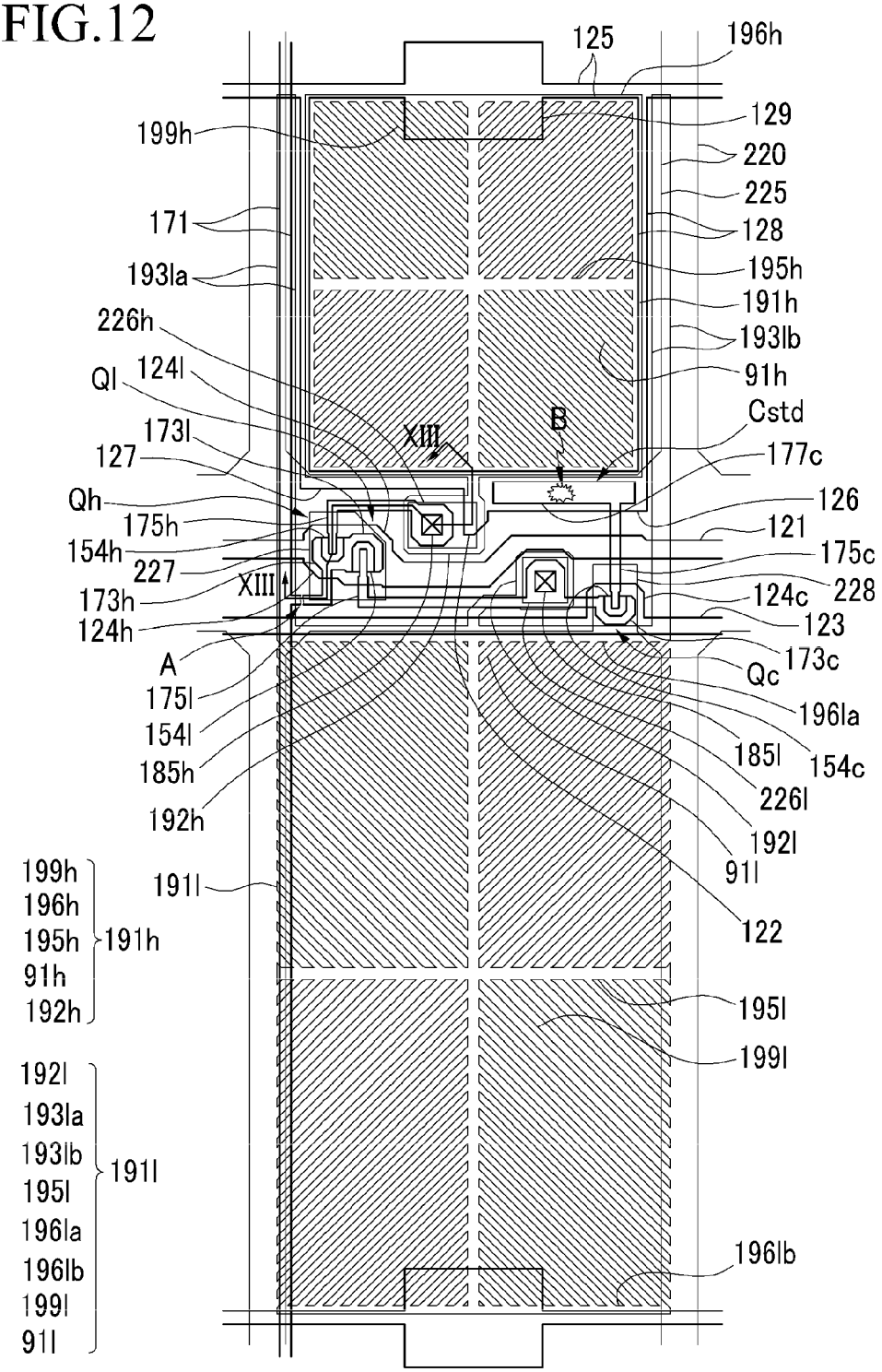
FIG. 12 is a layout view of a liquid crystal display according to an exemplary embodiment.
Figure 13:
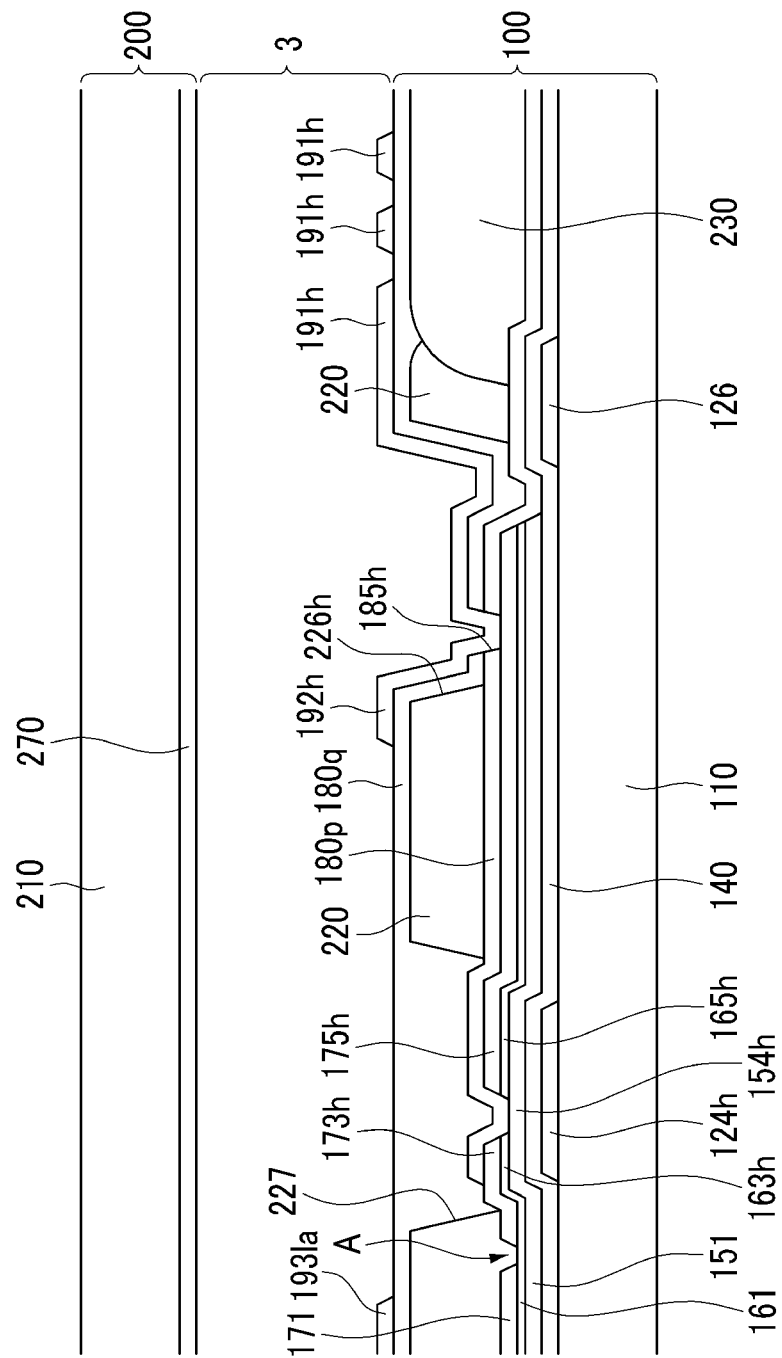
FIG. 13 is a cross-sectional view of the liquid crystal display shown in FIG. 12 taken along the line XIII-XIII.

FIG. 12 is a layout view of a liquid crystal display according to an exemplary embodiment, and FIG. 13 is a cross-sectional view of the liquid crystal display shown in FIG. 12 taken along the line XIII-XIII.

A liquid crystal display according to the present exemplary embodiment includes a lower panel 100 and an upper panel 200 that are facing each other, and a liquid crystal layer 3 interposed between the two display panels 100 and 200.

First, referring to the upper panel 200, a common electrode 270 is formed on an insulation substrate 210, and an alignment layer (not shown) is formed on the common electrode 270.

The liquid crystal layer 3 between the lower panel 100 and the upper panel 200 has negative dielectric anisotropy, and may be oriented such that the major axes of the liquid crystal molecules of the liquid crystal layer 3 are almost perpendicular to the surfaces of the two display panels 100 and 200 when no electric field is applied.

Next, referring to the lower panel 100, a plurality of gate conductors including a plurality of first gate lines 121, a plurality of second gate lines 123, and a common voltage line 125 are formed on an insulation substrate 110. The common voltage line 125 includes an electrode 129 that protrudes upward and downward, a pair of longitudinal portions 128 that extend vertically to the first gate line 121, and a transverse portion 127 connecting the ends of a pair of longitudinal portions 128 to each other. The transverse portion 127 includes an expansion 126 expanding downward and a protrusion 122 that protrudes downward.

A gate insulating layer 140 is formed on the gate conductor 121, 123, and 125.

A plurality of semiconductor stripes 151 are formed on the gate insulating layer 140. The semiconductor stripe 151 includes first and second semiconductors 154h and 154l that are connected to each other, and a third semiconductor 154c connected to the second semiconductor 154l.

A plurality of ohmic contact stripes 161 are formed on the semiconductor stripe 151, a pair of ohmic contacts 163h and 165h are formed on the first semiconductor 154h, and a pair of ohmic contacts (not shown) are respectively formed on the second semiconductor 154l and the third semiconductor 154c.

A data conductor that includes a plurality of data lines 171, a plurality of first drain electrodes 175h, a plurality of second drain electrodes 175l, and a plurality of third drain electrodes 175c is formed on the ohmic contacts 161 and 165h. Data line 171 includes a first source electrode 173h and a second source electrode 173l. The first drain electrode 175h, the second drain electrode 175l, and the third drain electrode 175c each have one end portion that has a wide area and the other end portion that has a linear, bar shape. The bar-shaped end portions of the first drain electrode 175h and the second drain electrode 175l are partially enclosed by the first source electrode 173h and the second source electrode 173l, respectively. The wide end of the second drain electrode 175l is again extended, thereby forming the third source electrode 173c that is curved and has a "U" shape. The wide end 177c of the third drain electrode 175c overlaps with the expansion 126 of the common voltage line 125 thereby forming the voltage-changing capacitor Cstd, and the bar-shaped end thereof is partially enclosed by the third source electrode 173c.

The first, second, and third gate electrode 124h, 124l, and 124c, the first, second, and third source electrode 173h, 173l, and 173c, and the first, second, and third drain electrode 175h, 175l, and 175c form the first, second, and third thin film transistor Qh, Ql, and Qc along with the first, second, and third semiconductor island 154h, 154l. and 154c.

A lower passivation layer 180p typically made of an inorganic insulator such as silicon nitride or silicon oxide is formed on the data conductors 171, 175h, 175l, and 175c and the exposed semiconductors 154h, 154l, and 154c, and a color filter 230 is formed on the lower passivation layer 180p.

A light blocking member 220 is formed on the region that the color filter 230 does not occupy and on a portion of the color filter 230. The light blocking member 220 includes a portion that covers the region where the first thin film transistor Ql, the second thin film transistor Ql, and the third thin film transistor Qc, and also a portion that extends along the data line 171. The light blocking member 220 includes an opening 225 exposing a substantial part of the first subpixel electrode 191h and the second subpixel electrode 191l. The light blocking member 220 may include an opening 227 disposed on the first thin film transistor Qh and the second thin film transistor Ql, an opening 226h disposed on the wide end of the first drain electrode 175h, an opening 226l disposed on the wide end of the second drain electrode 175l, and an opening 228 disposed on the third thin film transistor Qc. The openings 226h, 226l, 227, and 228 where the light blocking member 220 is removed are capable of being used to test for defects in the thin film transistor etc. in the manufacturing process of the liquid crystal display.

An upper passivation layer 180q is formed on the color filter 230 and the light blocking member 220.

The lower passivation layer 180p and the upper passivation layer 180q have a plurality of contact holes 185h and 185l respectively exposing the wide ends of the first drain electrode 175h and the second drain electrode 175l. The contact holes 185h and 185l are disposed in the openings 226h and 226l of the light blocking member 220.

A pixel electrode including the first subpixel electrode 191h and the second subpixel electrode 191l is formed on the upper passivation layer 180q.

The overall shape of the first subpixel electrode 191h is a quadrangle, and includes a cross stem 195h that has a transverse stem and a longitudinal stem, an outer stem 196h that encloses the periphery, and a protrusion 192h that protrudes downward from the longitudinal stem of the cross stem 195h.

The overall shape of the second subpixel electrode 191l is also a quadrangle, and includes a cross stem 195l that has a transverse stem and a longitudinal stem, an upper transverse portion 196la, a lower transverse portion 196lb, and a protrusion 192l that protrudes upward from the upper portion of the longitudinal stem of the cross stem 195l and right and left longitudinal portions 193la and 193lb disposed on the right and left sides of the first subpixel electrode 191h. The right and left longitudinal portions 193la and 193lb may prevent capacitive coupling between the data line 171 and the first subpixel electrode 191h.

The first subpixel electrode 191h and the second subpixel electrode 191l are respectively divided into four subregions by the cross stems 195h and 195l. Each subregion includes a plurality of tiny branch electrodes 199h and 199l obliquely extending outside from the cross stems 195h and 195l, and tiny slits 91h and 91l are disposed between the neighboring tiny branches 199h and 199l.

The protrusion 192h of the first subpixel electrode 191h receives the data voltage from the first drain electrode 175h through the first contact hole 185h, and the protrusion 192l of the second subpixel electrode 191l receives the data voltage from the second drain electrode 175l through the second contact hole 185l. Here, the data voltage applied to the second subpixel electrode 191l may be less than the data voltage applied to the first subpixel electrode 191h.

An alignment layer (not shown) may be formed on the first and second subpixel electrodes 191h and 191l, and the upper passivation layer 180q.

In an exemplary embodiment, the first and second subpixel electrodes 191h and 191l include four subregions where the length directions of the tiny branches 199h and 199l or the tiny slits 91h and 91l are different such that the inclined directions of the liquid crystal molecules of the liquid crystal layer 3 are all four directions. Therefore, the viewing angle of the liquid crystal display is widened by varying the inclined directions of the liquid crystal molecules.

Also, the several characteristics and the operations of the liquid crystal display according to the exemplary embodiment shown in FIG. 1 to FIG. 4 may be applied to the present exemplary embodiment.

When the pixel is defective in an exemplary embodiment as shown in FIG. 12 and FIG. 13, the portion A is disconnected between the data line 171 and the first source electrode 173h of the first thin film transistor Qh by using, for example, a laser, and the wide end 177c of the third drain electrode 175c and the expansion 126 of the common voltage line 125 forming two terminals of the voltage-changing capacitor Cstd are shorted (the portion B) by, for example, using a laser.

Thus, as in the above-described exemplary embodiment, the first and second thin film transistors Qh and Ql are separated from the data line 171 such that they are not applied with the data voltage, and the drain electrode 175c of the third thin film transistor Qc is directly connected to the common voltage Vcom. The repairing method and the several characteristics of the liquid crystal display according to the exemplary embodiment shown in FIG. 8 to FIG. 10 may be applied to the present exemplary embodiment.

According to an exemplary embodiment, the source electrodes of the first and second thin film transistors in the pixel that is defective in a liquid crystal display are disconnected from the data line and the two terminals of the voltage-changing capacitor are shorted such that the first subpixel electrode or the first and second subpixel electrodes are applied with the common voltage, thereby repairing the defective pixel.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for repairing a liquid crystal display including a plurality of data lines and a first pixel and a second pixel, wherein the first pixel and the second pixel respectively include a first subpixel electrode and a second subpixel electrode, a first switching element including a first drain electrode connected to the first subpixel electrode and a first source electrode opposing the first drain electrode, a second switching element including a second drain electrode connected to the second subpixel electrode and a second source electrode opposing the second drain electrode, a third switching element including a third source electrode connected to the second drain electrode and a third drain electrode opposing the third source electrode, and a voltage-changing capacitor including the third drain electrode and a common voltage line transmitting a common voltage as its two terminals, the method comprising:
disconnecting the first source electrode and the second source electrode of the second pixel from any of the plurality of data lines; and
shorting the two terminals of the voltage-changing capacitor to the second pixel.

2. The method of claim 1, wherein
the first source electrode and the second source electrode of the first pixel are connected to a data line of the plurality of data lines.

3. The method of claim 1, wherein
the liquid crystal display further includes a plurality of first gate lines, wherein one first gate line is connected to the first switching element and the second switching element of the first pixel and one first gate line is connected to the first switching element and the second switching element of the second pixel, and a plurality of second gate lines wherein one second gate line is connected to the third switching element of the first pixel and one second gate line is connected to the third switching element of the second pixel.

4. The method of claim 3, wherein
the first subpixel electrode of the second pixel is electrically connected to the first source electrode of the second pixel independently of a gate signal of the first gate line connected to the first switching element and the second switching element of the second pixel.

5. The method of claim 4, wherein
the second subpixel electrode of the second pixel is electrically connected to the second source electrode of the second pixel independently of a gate signal of the first gate line connected to the first switching element and the second switching element of the second pixel.

6. The method of claim 3, wherein
the second subpixel electrode of the second pixel is electrically connected to the second source electrode of the second pixel independently of a gate signal of the first gate line connected to the first switching element and the second switching element of the second pixel.

7. The method of claim 3, wherein
the second gate line connected to the third switching element of the first pixel is applied with a gate-off voltage Voff when the first gate line connected to the first switching element and the second switching element of the first pixel is applied with the gate-on voltage Von, and the first gate line connected to the first switching element and the second switching element of the first pixel is applied with the gate-off voltage Voff when the second gate line connected to the third switching element of the first pixel is applied with the gate-on voltage Von.

8. The method of claim 7, wherein
in the first pixel, the voltages of the first subpixel electrode and the second subpixel electrode are changed when the second gate line connected to the third switching element of the first pixel is applied with the gate-on voltage Von.

9. The method of claim 7, wherein
in the second pixel, the common voltage is transmitted to the second subpixel electrode when the second gate line connected to the third switching element of the second pixel is applied with the gate-on voltage Von.

10. The method of claim 9, wherein
in the second pixel, the first subpixel electrode is electrically connected to the second subpixel electrode when the first gate line connected to the first switching element and the second switching element of the second pixel is applied with the gate-on voltage Von.

11. The method of claim 3, wherein
in the second pixel, the second subpixel electrode is applied with the common voltage when the second gate line connected to the third switching element of the second pixel is applied with the gate-on voltage Von.

12. The method of claim 11, wherein
in the second pixel, the first subpixel electrode is also applied with the common voltage when the second gate line connected the third switching element of the second pixel is applied with the gate-on voltage Von.

13. The method of claim 1 wherein
the common voltage is transmitted to the second subpixel electrode in the second pixel.

14. The method of claim 13, wherein
in the second pixel, the first subpixel electrode is electrically connected to the second subpixel electrode when the first gate line connected to the first switching element and the second switching element of the second pixel is applied with the gate-on voltage Von.

15. The method of claim 13, wherein
the common voltage is also transmitted to the first subpixel electrode in the second pixel.

16. The method of claim 1, wherein
at least one of the disconnecting of the first source electrode and the second source electrode of the second pixel from any of the plurality of data lines and the shorting of the two terminals of the voltage-changing capacitor in the second pixel comprises using a laser.

* * * * *